United States Patent
Nagasawa

(12) 
(10) Patent No.: US 11,242,028 B2
(45) Date of Patent: Feb. 8, 2022

(54) OUTSIDE PROTECTION APPARATUS FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/083,710

(22) Filed: Oct. 29, 2020

(65) Prior Publication Data
US 2021/0197756 A1 Jul. 1, 2021

(30) Foreign Application Priority Data

Dec. 27, 2019 (JP) .............................. JP2019-239816
Oct. 6, 2020 (JP) .............................. JP2020-168802

(51) Int. Cl.
*B60R 21/36* (2011.01)
*B60R 21/00* (2006.01)

(52) U.S. Cl.
CPC ........ *B60R 21/36* (2013.01); *B60R 2021/003* (2013.01); *B60R 2021/0004* (2013.01)

(58) Field of Classification Search
CPC .............. B60R 21/36; B60R 2021/003; B60R 2021/0004; B60R 2021/01211; B60R 21/2338; B60R 2021/346
See application file for complete search history.

(56) References Cited

U.S. PATENT DOCUMENTS

| 2010/0116580 A1* | 5/2010 | Choi ....................... B60R 21/36 180/274 |
| 2013/0154247 A1* | 6/2013 | Rick ..................... B60R 19/205 280/762 |
| 2017/0088078 A1* | 3/2017 | Nagasawa ............. B60R 21/013 |
| 2019/0375366 A1* | 12/2019 | Kanno ................ B60R 21/0134 |
| 2020/0307503 A1* | 10/2020 | Nagasawa ............... B60R 21/36 |
| 2020/0307504 A1* | 10/2020 | Nagasawa ............... B60R 21/36 |

FOREIGN PATENT DOCUMENTS

| CN | 112572335 A * | 3/2021 | |
| GB | 2379418 A * | 3/2003 | ......... B60R 21/2338 |
| JP | 2017-178205 A | 10/2017 | |
| WO | WO-2013107801 A1 * | 7/2013 | ............. B60R 21/36 |

* cited by examiner

*Primary Examiner* — James A English
*Assistant Examiner* — Kurtis Nielson
(74) *Attorney, Agent, or Firm* — Smith, Gambrell & Russell, LLP

(57) ABSTRACT

An outside protection apparatus for a vehicle includes an outside airbag device. The outside airbag device includes a bag body expandable to be overlaid on an outer surface of a body of the vehicle, and an inflator configured to expand the bag body. The bag body includes an irregularity formation member at an inner surface of the bag body, and a tether coupled to the irregularity formation member to be bridged in an inner portion of the bag body in a state in which the bag body is expanded. The irregularity formation member forms a projection at a surface of the bag body in response to tension acting on the tether in the state in which the bag body is expanded.

16 Claims, 12 Drawing Sheets

-- PRIOR ART --

OUTSIDE PROTECTION APPARATUS FOR VEHICLE

CROSS-REFERENCE TO RELATED APPLICATIONS

The present application claims priority from Japanese Patent Application No. 2019-239816 filed on Dec. 27, 2019 and Japanese Patent Application No. 2020-168802 filed on Oct. 6, 2020, the entire contents of which are hereby incorporated by reference.

BACKGROUND

The disclosure relates to an outside protection apparatus for a vehicle.

On a road outside a vehicle, there are present other moving objects, pedestrians, cyclists, riders, and the like. The vehicle has a possibility of colliding with such an outside person and the like during traveling or during parking or stopping. Therefore, it has been considered to provide vehicles with an outside protection apparatus (Japanese Unexamined Patent Application Publication (JP-A) No. 2017-178205).

SUMMARY

An aspect of the disclosure provides an outside protection apparatus for a vehicle. The apparatus includes an outside airbag device. The outside airbag device includes a bag body expandable to be overlaid on an outer surface of a body of the vehicle, and an inflator configured to expand the bag body. The bag body includes an irregularity formation member at an inner surface of the bag body, and a tether coupled to the irregularity formation member to be bridged in an inner portion of the bag body in a state in which the bag body is expanded. The irregularity formation member forms a projection at a surface of the bag body in response to tension acting on the tether in the state in which the bag body is expanded.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

It is conceivable for a vehicle to expand, instead of moving a bonnet hood as in JP-A No. 2017-178205, an airbag for an outside person, for example, on a bonnet hood or in front of a windshield and pillars at left and right two side portions of the windshield. Using such an outside airbag device may avoid a direct collision of an outside person with a vehicle body.

There is however a possibility that this is not necessarily sufficient as protection of an outside person.

For an outside protection apparatus for a vehicle, a further improvement in protection of an outside person is desirably addressed.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1A:
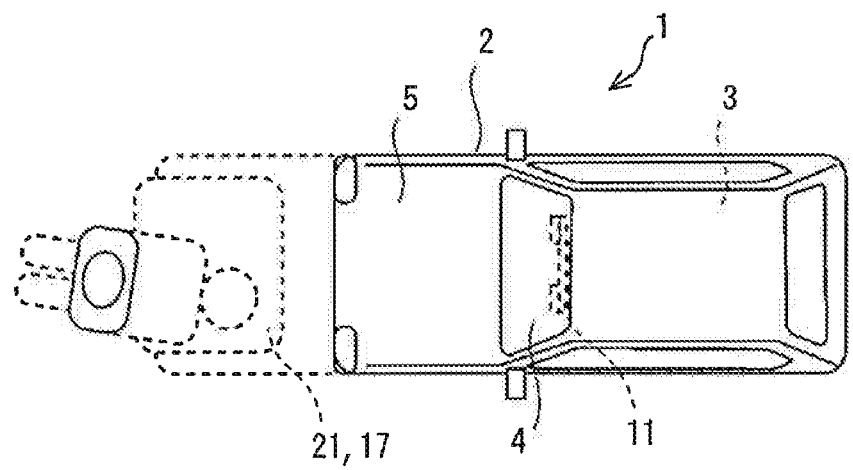
FIG. 1A and FIG. 1B are illustrations of an automobile according to an embodiment of the disclosure.
Figure 1B:
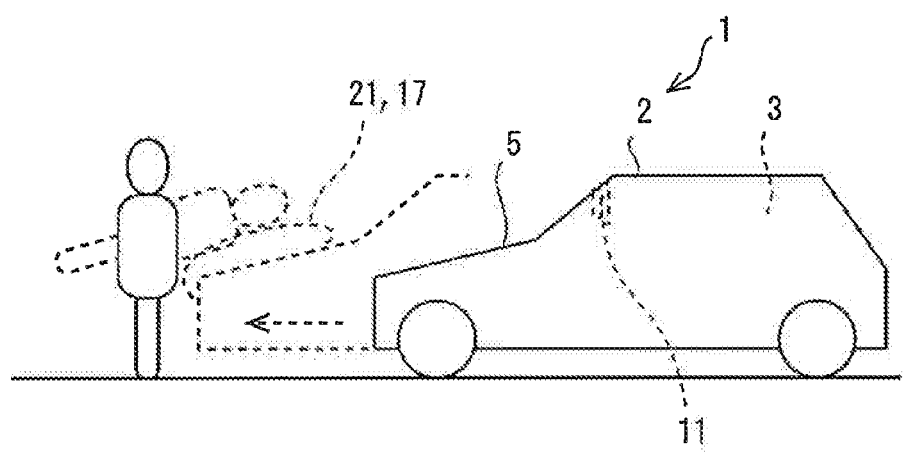

FIG. 1A and FIG. 1B are illustrations of an automobile 1 according to an embodiment of the disclosure.

FIG. 1A is a top view of the automobile 1. FIG. 1B is a left side view of the automobile 1. FIG. 1A and FIG. 1B illustrate, together with the automobile 1, a pedestrian as an outside person present outside the automobile 1. In addition, for example, a cyclist, a rider, and the like may be present outside the automobile 1.

These outside persons may traverse by crossing in front of the automobile 1 that travels. Then, the automobile 1 has a possibility of colliding with the person that intends to cross in front of the automobile 1.

The automobile 1 in FIG. 1A and FIG. 1B is an example of a vehicle. The automobile 1 includes a body 2. In front of a cabin 3 of the body 2, a windshield 4 is provided. At the front portion of the body 2 on the front side from the windshield 4, a bonnet hood 5 is provided to be openable and closable.

Figure 2:
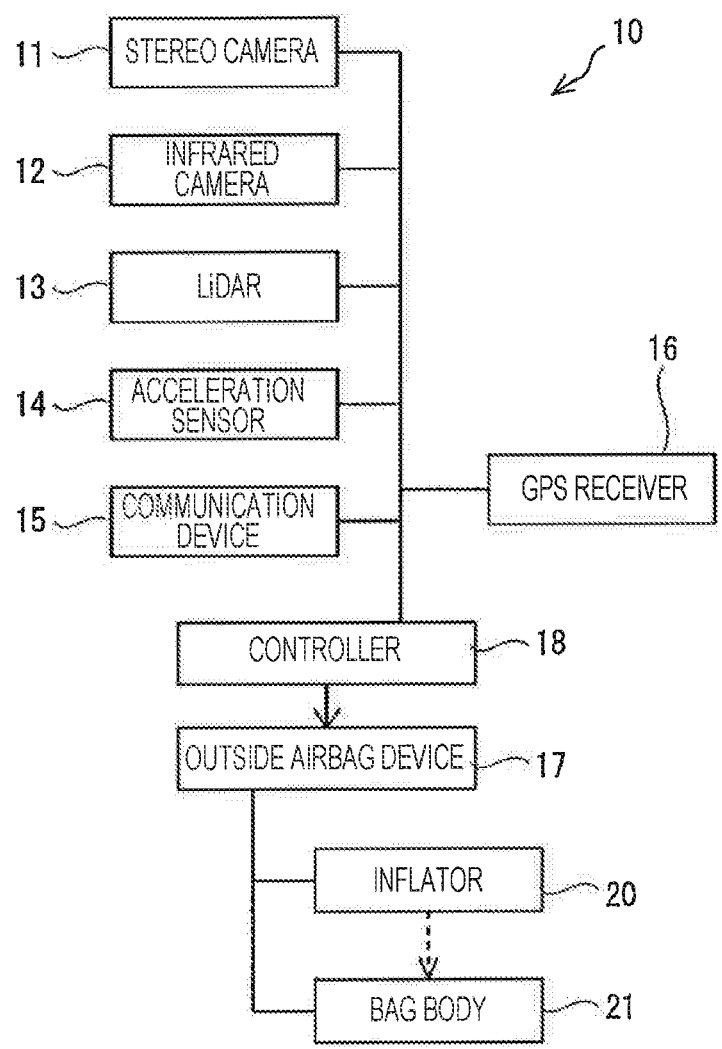
FIG. 2 is a block diagram of an outside protection apparatus that is applied to the automobile in FIG. 1A and FIG. 1B.

FIG. 2 is a block diagram of an outside protection apparatus 10 that is applied to the automobile 1 in FIG. 1A and FIG. 1B.

The outside protection apparatus 10 in FIG. 2 includes a stereo camera 11, an infrared camera 12, a LiDAR 13, an acceleration sensor 14, a communication device 15, a GPS receiver 16, an outside airbag device 17, and a controller 18 to which these are coupled. Each of these sensors and devices of the outside protection apparatus 10 may be coupled to a CPU as the controller 18 by a vehicle network (not illustrated).

The stereo camera 11 is disposed at, for example, a front portion of a cabin, as illustrated in FIG. 1A and FIG. 1B, to be directed to the front. The stereo camera 11 includes a plurality of imaging devices disposed side by side in a vehicle width direction. The stereo camera 11 images an outside person and the like to be imaged by the plurality of imaging devices. The stereo camera 11 may calculate a direction and a distance regarding an imaged outside person based on the body 2. The stereo camera 11 may calculate, on the basis of the position of an outside person that is a subject in images imaged by the plurality of imaging devices, the direction and the distance of the subject by, for example, triangulation or the like. In addition, the stereo camera 11 may calculate presence/absence of the movement, the movement direction, the movement velocity, and the like of a subject from a change in the position of the subject in images imaged by shifting time.

The infrared camera 12 is disposed at, for example, a front portion of the cabin, as with the stereo camera 11, to be directed to the front. The infrared camera 12 images an infrared image in which an outside person and the like are imaged.

The LiDAR 13 is disposed at, for example, a front portion of the body 2 to be directed to the front. The LiDAR 13 emits light toward the front and obtains the direction, the distance, the velocity, and the like of a subject on the basis of reflection light reflected by an outside person in front of the body 2.

The body 2 is provided with the acceleration sensor 14. Acceleration that acts on the acceleration sensor 14 is detected. When the body 2 comes into contact with a moving object, such as a person, the acceleration sensor 14 detects large acceleration such as that not generated during normal traveling. In this case, the acceleration sensor 14 may output detection of a collision. In this case, the acceleration sensor 14 serves as a collision detector that predicts or detects contact between the body 2 and the other moving object.

The communication device 15 communicates through wireless communication with the other moving objects, for example, the other communication devices 15 of the other automobile 1 and pedestrians, base stations disposed along roads, and the like. The communication device 15 may obtain the current position, the movement direction, the movement velocity, and the like of the other moving objects from the other communication devices 15.

The GPS receiver 16 receives radio waves from GPS satellites and the like and obtains the current position, the movement velocity, and the like of the automobile 1.

Information on, for example, the current position of the automobile 1 may be based on information according to a GNSS receiver other than GPS or information provided by a mobile telephone.

The outside airbag device 17 includes a bag body 21 expandable to be overlaid on the outer surface of the body 2 of the automobile 1, and an inflator 20 that expands the bag body 21. The bag body 21 may include, for example, nylon or the other resin fiber to have smooth surfaces. For example, as illustrated in FIG. 1A and FIG. 1B, the bag body 21 may be expanded on the bonnet hood 5 at the front portion of the body 2. In this case, when the upper body of an outside person that comes into contact with the front of the body 2 falls down toward the front portion of the body 2, the bag body 21 that is to be expanded on the bonnet hood 5 is expanded between the upper body and the bonnet hood 5. The body of the outside person that comes into contact with the body 2 is suppressed from easily coming into direct contact with the bonnet hood 5. As a result of the expanded bag body 21 being flexed or contracted by the load of the body of the outside person, strong impact is suppressed from easily acting on the body of the outside person. The expanded bag body 21 can absorb the impact that acts on the outside person.

The controller 18 is, for example, a CPU. The controller 18 may be provided as, for example, a CPU dedicated to the outside airbag device 17 in the automobile 1 or may be provided as a CPU of inside and outside protection devices of the automobile 1 in the automobile 1. The CPU reads a program from a storage, such as a ROM, and executes the program. Thus, the CPU serves as the controller 18 of the outside airbag device 17 for protecting at least an outside person. The controller 18 of the outside airbag device 17 obtains, from collision detectors, such as the stereo camera 11, the infrared camera 12, the LiDAR 13, the acceleration sensor 14, and the communication device 15, information on a pedestrian, a cyclist, a rider, or the like that moves on a route of the automobile 1 or that intends to move toward the route. When contact with an outside person is predicted or detected on the basis of the obtained information, the CPU controls expansion of the bag body 21 of the outside airbag device 17.

Figure 3:
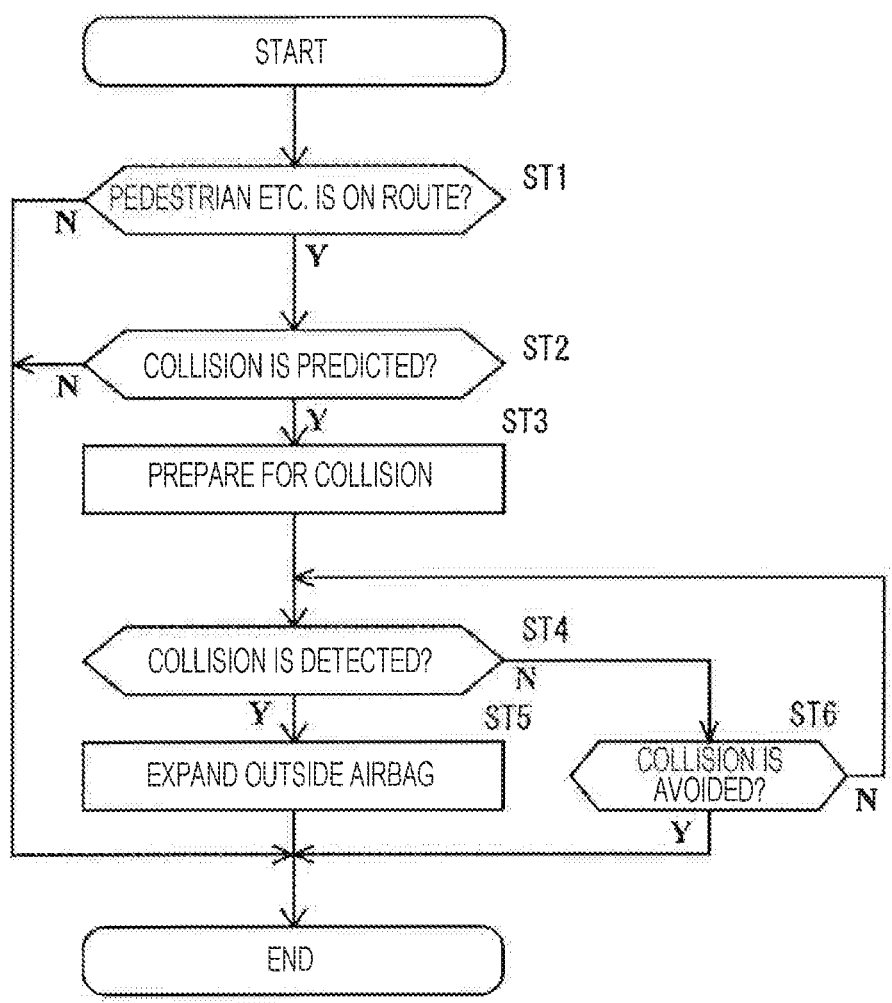
FIG. 3 is a flow chart of outside protection control by a controller in FIG. 2.

FIG. 3 is a flow chart of outside protection control by the controller 18 in FIG. 2.

The controller 18 executes the outside protection control in FIG. 3 repeatedly when, for example, the automobile 1 travels. The controller 18 may execute the outside protection control in FIG. 3, for example, periodically or at every time when the automobile 1 obtains new information. The new information that the automobile 1 obtains may be the above-described information on a pedestrian, a cyclist, a rider, or the like that moves on the route of the automobile 1 or that intends to move toward the route but is not limited thereto. The controller 18 may start the processing in FIG. 3 on the basis of obtaining new information.

In a step ST1, the controller 18 determines whether a pedestrian and the like are present on a route of the automobile 1 on the basis of newly obtained information on outside persons. The controller 18 may determine whether a pedestrian and the like are present on a route of the automobile 1 on the basis of, for example, whether the position of a detected outside person is on the route, whether the movement direction of the detected outside person intersects the route, and the like. When a pedestrian and the like are not present on the route of the automobile 1, the controller 18 ends the processing in FIG. 3. When a pedestrian and the like are present on the route of the automobile 1, the controller 18 causes the processing to proceed to a step ST2.

In the step ST2, the controller 18 predicts a collision with a pedestrian and the like present on the route of the automobile 1. The controller 18 may predict a collision with a pedestrian and the like on the route of the automobile 1 on the basis of, for example, whether a time difference between a time when the automobile 1 reaches the position of the pedestrian or the position of intersection and a time when the pedestrian reaches the position of intersection is a predetermined value or less. When a collision with a pedestrian and the like on the route of the automobile 1 is not predicted, the controller 18 ends the processing in FIG. 3. When a collision with a pedestrian and the like on the route of the automobile 1 is predicted, the controller 18 causes the processing to proceed to a step ST3.

In the step ST3, the controller 18 starts preparation for a collision with a pedestrian and the like on the route of the automobile 1. For example, the controller 18 causes the outside airbag device 17 to start. For example, the outside airbag device 17 is caused to enter a state in which the inflator 20 is able to jet a high-pressure gas in response to an input of an ignition signal. For example, when the expansion start location and the expansion start direction of the bag body 21 are adjustable, the outside airbag device 17 adjusts the expansion start location and the expansion start direction of the bag body 21 so that the bag body 21 is expanded from a portion that is predicted to collide with a pedestrian.

In a step ST4, the controller 18 detects a predicted collision with a pedestrian and the like on the basis of presence/absence of collision detection by the acceleration sensor 14. When a collision is detected by the acceleration sensor 14, the controller 18 causes the processing to proceed to a step ST5. When no collision is detected by the acceleration sensor 14, the controller 18 causes the processing to proceed to a step ST6.

In the step ST5, the controller 18 expands the outside airbag. The controller 18 outputs an ignition signal to the outside airbag device 17. The inflator 20 of the outside airbag device 17 jets a high-pressure gas into the bag body 21. The bag body 21 is expanded on the bonnet hood 5.

In a step ST6, the controller 18 determines whether a collision is avoided, on the basis of information that is newly obtained after the determination in the step ST1. The controller 18 may determine whether a collision with a pedestrian and the like for which a collision is predicted is avoided, on the basis of, for example, whether the position of an outside person for which a collision is predicted has moved to the outside of the route, whether the movement direction of a detected outside person has changed and avoided intersection with the route, and the like. When a collision is avoided, the controller 18 ends the processing in FIG. 3. When a collision is not avoided, the controller 18 returns the processing to the step ST4. In this case, the controller 18 repeats the processing in the step ST4 and the step ST6 until a collision is detected or avoided.

Meanwhile, in such an automobile 1 according to the present embodiment, an airbag for an outside person can be expanded on the bonnet hood 5. By using such an outside airbag device 17, a direct collision of an outside person with the body 2 can be avoided.

There is however a possibility that this is not necessarily sufficient as protection of an outside person.

For example, after a direct collision of an outside person with the body 2 is avoided by the expanded bag body 21, the outside person may have a possibility of moving from on the bag body 21 that has been expanded and dropping down from the bonnet hood 5. When an outside person drops down to a side of the automobile 1, there is a possibility of the outside person secondarily colliding with the other automobile 1 or the like that travels on an adjacent lane.

Figure 4:
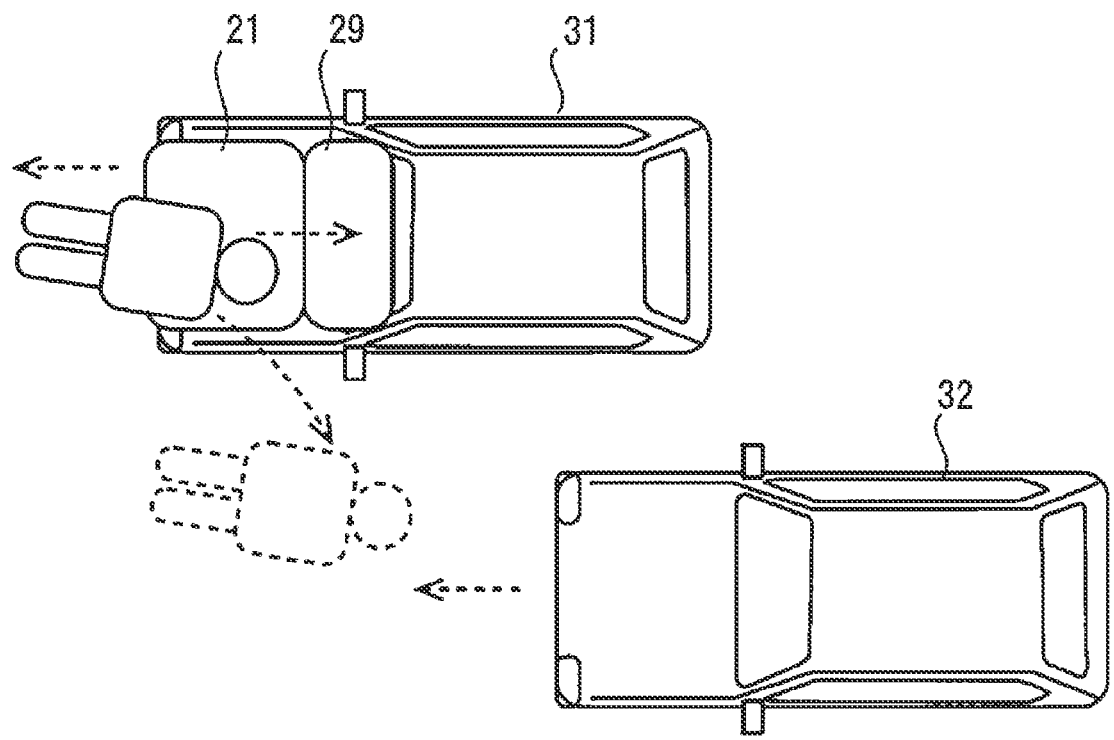
FIG. 4 is an illustration of a secondary collision predictable for an outside pedestrian, a cyclist, or the like that has collided with a first automobile.

FIG. 4 is an illustration of a secondary collision assumable for an outside pedestrian, a cyclist, or the like that has collided with a first automobile 30.

FIG. 4 illustrates an outside pedestrian, the first automobile 30 that has collided with the pedestrian, and a second automobile 31 that intends to pass a side of the first automobile 30.

The pedestrian that has collided with the first automobile 30 is supposed to be first placed on the bag body 21 that is expanded on the bonnet hood 5. Then, the pedestrian that has collided has a possibility of, for example, sliding rearward on the bag body 21. In this case, the pedestrian that has collided has a possibility of coming into contact with the other bag body 21 that is expanded at the front of the windshield 4 and being able to stop at the position. Meanwhile, for example, the pedestrian that has collided as a result of moving so as to cross in immediate front the automobile 1 has a possibility of moving obliquely rearward after placed on the bag body 21 expanded on the bonnet hood 5. In this case, when a movement in the vehicle width direction is large, the pedestrian that has collided has a possibility of dropping down from on the bonnet hood 5 to a side of the first automobile 30. When the second automobile 31 intends to pass the side of the first automobile 30, the pedestrian that has dropped has a possibility of further coming into contact with the second automobile 31.

Thus, for the outside protection apparatus 10 of the automobile 1, a further improvement in protection of an outside persons is desirably addressed.

Figure 5A:
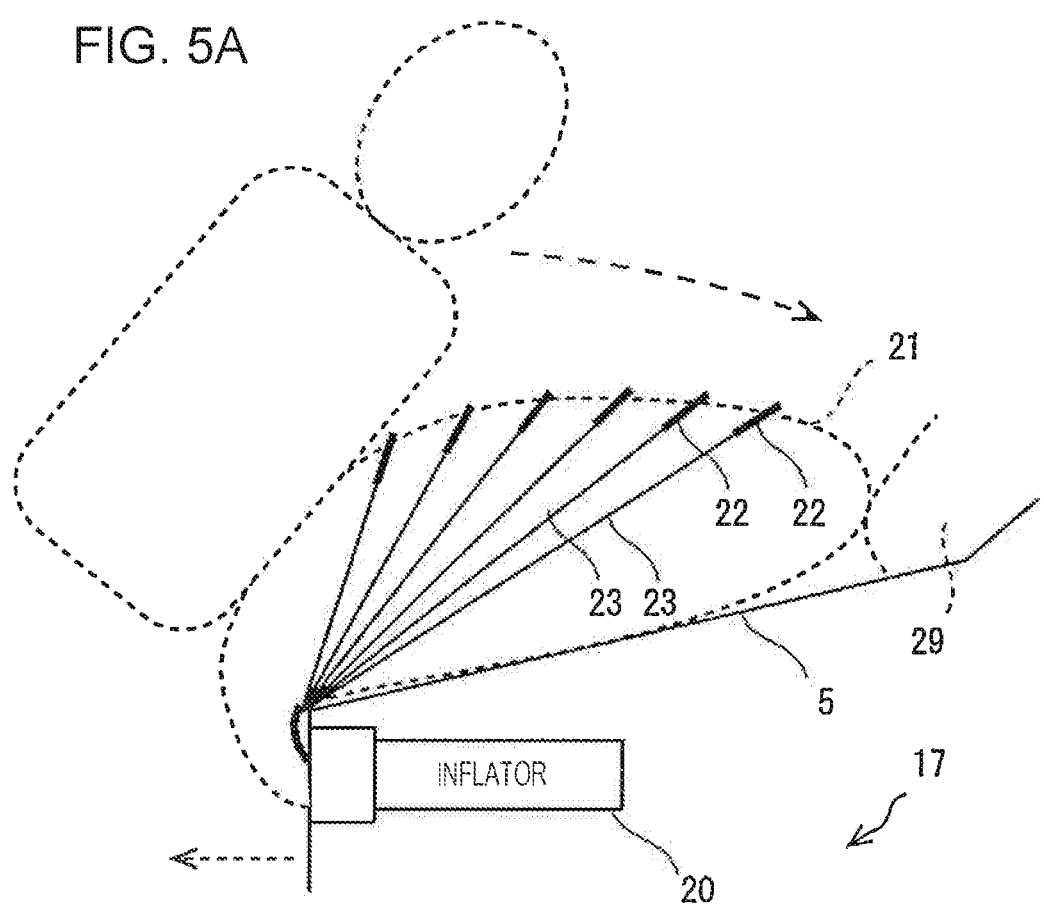
FIG. 5A and FIG. 5B are illustrations of an expanded state of an outside airbag device according to a first embodiment of the disclosure, a bag body of the outside airbag device being expanded to the maximum extent in FIG. 5A and FIG. 5B.
Figure 5B:
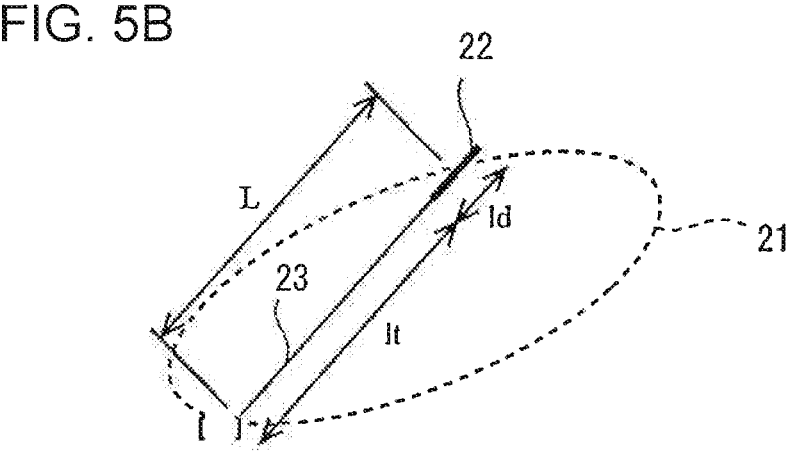

FIG. 5A and FIG. 5B are illustrations of an expanded state of the outside airbag device 17 according to a first embodiment of the disclosure. In FIG. 5A, the bag body 21 of the outside airbag device 17 is expanded to the maximum extent.

In the outside airbag device 17, the inflator 20 is disposed at the front surface of the body 2. The bag body 21 has a shape that is expandable rearward from the front surface of the body 2. The bag body 21 that has been expanded rearward from the front surface of the body 2 is expanded on the bonnet hood 5.

The outside airbag device 17 in FIG. 5A and FIG. 5B includes a plurality of irregularity formation members 22 and a plurality of tethers 23 in the inner portion of the bag body 21.

The plurality of irregularity formation members 22 are discretely disposed at the upper surface of the bag body 21 that is in a state of being expanded on the bonnet hood 5. The upper surface of the bag body 21 in the state of being expanded on the bonnet hood 5 is a face with which the other moving objects, such as a pedestrian and the like, come into contact.

The irregularity formation members 22 each have a substantially rod-like shape. The irregularity formation members 22 are mounted at the inner surface of the bag body 21. The distal ends of the substantially rod-like shaped irregularity formation members 22 pass through the bag body 21 and project to the outside of the bag body 21.

Each tether 23 is coupled at one end to, of the irregularity formation member 22 corresponding thereto, an inner portion that projects in the inner side of the bag body 21. The tether 23 is fixed at the other end to the body 2. Here, the tether 23 is fixed to the front surface of the body 2, that is, the mounted location of the inflator 20 with respect to the body 2.

As illustrated in the schematic expanded state in FIG. 5B, a distance L from the location where the tether 23 is fixed in a state in which the bag body 21 is expanded to the maximum extent to the location where the irregularity formation member 22 is mounted with respect to the bag body 21 is shorter than a sum of a length ld of the irregularity formation member 22 and a length lt from one end to the other end of the tether 23.

In the state in which the bag body 21 is expanded, the tethers 23 are bridged between the body 2 and the irregularity formation members 22 in the inner portion of the bag body 21. In the state in which the bag body 21 is expanded to the maximum extent, the tethers 23 apply tension to the irregularity formation members 22.

Figure 6:
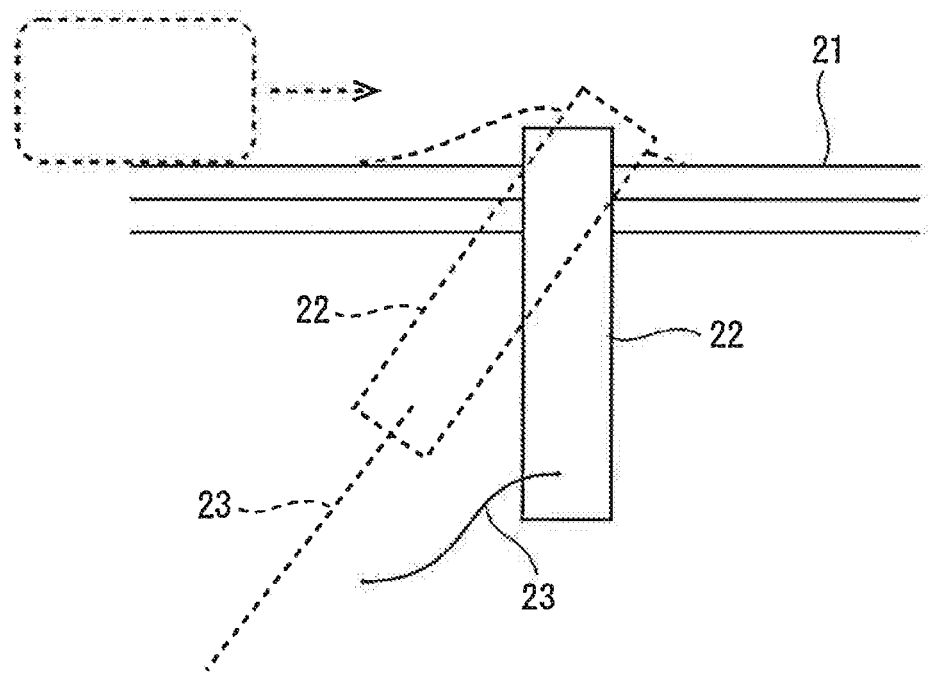
FIG. 6 is an illustration of a mounted state of an irregularity formation member with respect to the bag body and a movement of a tether.

FIG. 6 is an illustration of a mounted state of the irregularity formation member 22 with respect to the bag body 21 and a movement of the tether 23.

As indicated by the dotted lines in FIG. 6, each irregularity formation member 22 forms a projection at the bag body 21 in response to tension that acts on the tether 23 in the state in which the bag body 21 is expanded to the maximum extent. The plurality of irregularity formation members 22 maintained in an orientation extending in a direction intersecting the surface of the bag body 21 make the surface of the bag body 21 irregular. Although the bag body 21 is formed of a material, such as nylon, considering expansion properties so as to be expandable with a smooth aspect without irregularities to bear a high pressure, the surface as an airbag becomes irregular in the state of being expanded to the maximum extent.

Figure 7A:
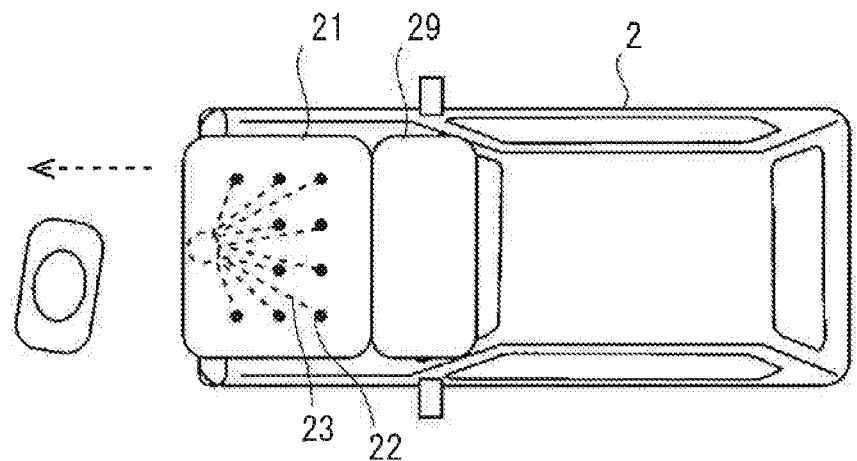
FIG. 7A, FIG. 7B, and FIG. 7C are illustrations of a protected state of an outside person protected by the outside airbag device according to the first embodiment.
Figure 7B:
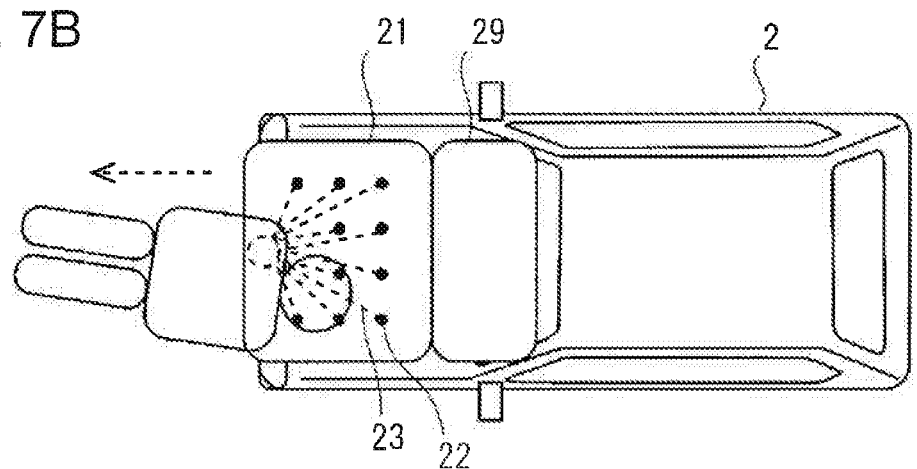
Figure 7C:
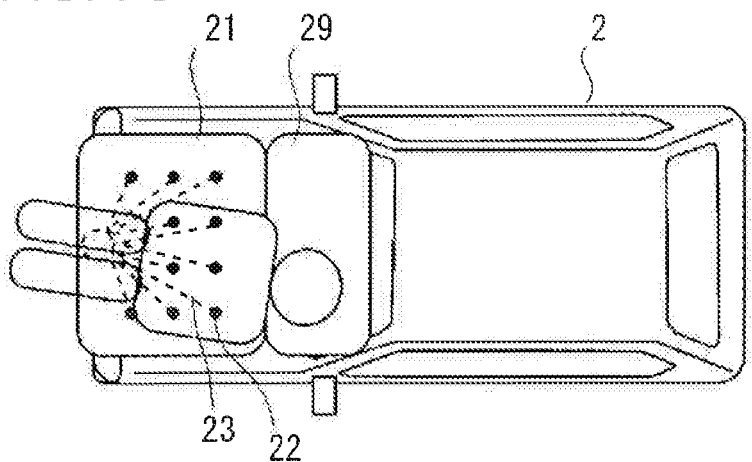

FIG. 7A, FIG. 7B, and FIG. 7C are illustrations of a protected state of an outside person protected by the outside airbag device 17 according to the first embodiment.

FIG. 7A illustrates an expanded state of the bag body 21 of the outside airbag device 17 before a collision. The bag body 21 starts to be expanded from a front portion of the body 2 and expanded on the bonnet hood 5. At the upper surface of the bag body 21 that has been expanded on the bonnet hood 5, a plurality of the irregularity formation members 22 are disposed. In a state in which the bag body 21 is expanded to the maximum extent as illustrated in FIG. 5A, FIG. 5B, and FIG. 6, the plurality of irregularity formation members 22 extend in a direction that intersects the upper surface of the bag body 21, due to the tethers 23 each coupled to a respective one of the plurality of irregularity formation members 22. In this case, the distal ends of the plurality of irregularity formation members 22 project at the upper surface of the bag body 21, which makes the upper surface of the bag body 21 be an irregular surface.

FIG. 7B illustrates a state in which an outside person has fallen down onto the bag body 21 in FIG. 7A as a result of a collision.

FIG. 7C illustrates a state after the collision in FIG. 7B.

In FIG. 7A, the plurality of irregularity formation members 22 are disposed side by side at the upper surface of the bag body 21 such that multiple numbers of the irregularity formation members 22 are provided at each of the front, the rear, the left, and the right. As illustrated in FIG. 7B, as a result of a collision, an outside person, such as a pedestrian, falls down onto the bag body 21 that has been expanded with an irregular surface at which the distal ends of the plurality of irregularity formation members 22 thus project. Then, the pedestrian that has collided has a possibility of moving rearward or obliquely rearward. The body of the outside person that has fallen down onto the bag body 21 is, however, caught by the distal ends of the plurality of irregularity formation members 22 projecting at the surface of the bag body 21 and suppressed from easily moving on the bag body 21 by a large amount. Due to the irregularity formation members 22 and the tethers 23 catching the body of the outside person, the outside person that is to be moved rearward may receive a pulling force toward the front or obliquely front of the body 2. Consequently, the body of the outside person that has fallen down onto the bag body 21 is suppressed from easily sliding down from on the bonnet hood 5 and easily remains on the bonnet hood 5.

As above, in the present embodiment, the outside airbag device 17 is expanded when contact is predicted or detected by the collision detectors. The outside airbag device 17 expands the bag body 21 to be overlaid on the outer surface of the body 2 of the automobile 1. Consequently, the outside airbag device 17 can avoid a direct collision of an outside person with the body 2 by the bag body 21 expanded to be overlaid on the outer surface of the body 2 of the automobile 1.

The bag body 21 of the present embodiment includes a plurality of the irregularity formation members 22 mounted at the inner surface of a portion of the bag body 21 that is to come into contact with the other moving object, and the plurality of tethers 23 each coupled to a respective one of the plurality of irregularity formation members 22 to be bridged in the inner portion of the bag body 21 in a state in which the bag body 21 is expanded. In a state in which the bag body 21 is expanded to the maximum extent, tension acts on the tethers 23 due to the expansion or weight application. The tension causes the irregularity formation members 22 to stand so as to each form a projection at the surface of the bag body 21. Consequently, irregularities are formed at the surface of the expanded bag body 21 by the plurality of irregularity formation members 22 in a state of extending, for example, in a direction intersecting the surface. Due to the irregularities of the surface of the expanded bag body 21, an outside person that comes into contact with the expanded bag body 21 receives an action with which the outside person is caught by the bag body 21 when to be moved rearward. The outside person is thus suppressed from easily dropping down from on the expanded bag body 21. For example, even if the bag body 21 is formed of nylon or the other resin fiber whose surface friction is not high to ensure its expansion performance and the like, the outside person is suppressed from easily dropping down from on the bag body 21. Consequently, the outside person for which a direct collision with respect to the body 2 is avoided by the expanded bag body 21 can be suppressed from moving from on the expanded bag body 21.

After expanded to the maximum extent as illustrated in FIG. 5A and FIG. 5B, the bag body 21 jets out a high-pressure gas through an exhaust valve (not illustrated) and thus shrinks. In the bag body 21 that has shrunk, the tethers 23 do not cause tension to act on the irregularity formation members 22. Thus, a period in which the irregularity formation members 22 extend in the direction intersecting the surface is temporary and not continuous. Therefore, the irregularity formation members 22 do not easily damage the body of an outside person.

In a period from when the expansion of the bag body 21 is started to when the bag body 21 is expanded to the maximum extent as illustrated in FIGS. 5A and 5B, the tethers 23 do not cause tension to act on the irregularity formation members 22. The expansion of the bag body 21 is suppressed from being easily impeded by the irregularity formation members 22 and the tethers 23. The bag body 21 can be expanded instantaneously into a desired shape smoothly without receiving influences of the tethers 23 and the irregularity formation members 22 as with when the tethers 23 and the irregularity formation members 22 are not present.

In particular, in the present embodiment, the irregularity formation members 22 pass through the bag body 21 such that the distal ends thereof project to the outside of the bag body 21. Each irregularity formation member 22 has the inner portion that projects in the inner side of the bag body 21, and the tether 23 corresponding thereto is coupled at one end to the inner portion. Consequently, the irregularity formation members 22 can maintain the state of being mounted at the inner surface of the bag body 21 even in a state in which tension of the tethers 23 acts. Moreover, due to the tension of the tethers 23, the irregularity formation members 22 can extend in the mounted location in the direction intersecting the inner surface and form irregularities at the surface of the expanded bag body 21. The distal ends of the irregularity formation members 22 pass through the bag body 21, and the distal ends project to the outside of the bag body 21. An outside person is thus easily caught directly by the irregularity formation members 22. The tethers 23 and the irregularity formation members 22 can improve performance of maintaining an outside person to be on the expanded bag body 21.

The tethers 23 coupled at respective one ends to the irregularity formation members 22 are fixed at respective other ends to the body 2. A distance from the location where each tether 23 is fixed in the state in which the bag body 21 is expanded to the maximum extent to the location where the irregularity formation member 22 corresponding thereto is mounted with respect to the bag body 21 is shorter than a sum of the length of the irregularity formation member 22 and the length from one end to the other end of the tether 23. Consequently, in the state in which the airbag is expanded to the maximum extent, the distal ends of the irregularity formation members 22 can project to the outside from the bag body 21.

In the aforementioned embodiment, in the state in which the bag body 21 is expanded to the maximum extent, the irregularity formation members 22 extend in the direction intersecting the surface of the bag body 21 due to the tension of the tethers 23. Alternatively, for example, the irregularity formation members 22 may extend in the direction intersecting the surface of the bag body 21 in response to the load of an outside person acting on the bag body 21 that has been expanded. In other words, the irregularity formation members 22 may extend in the direction intersecting the surface of the bag body 21, not only, for example, in the state in which the bag body 21 is expanded to the maximum extent, but also before and after the state as a result of the tension of the tethers 23 acting due to the load of an outside person.

Figure 8:
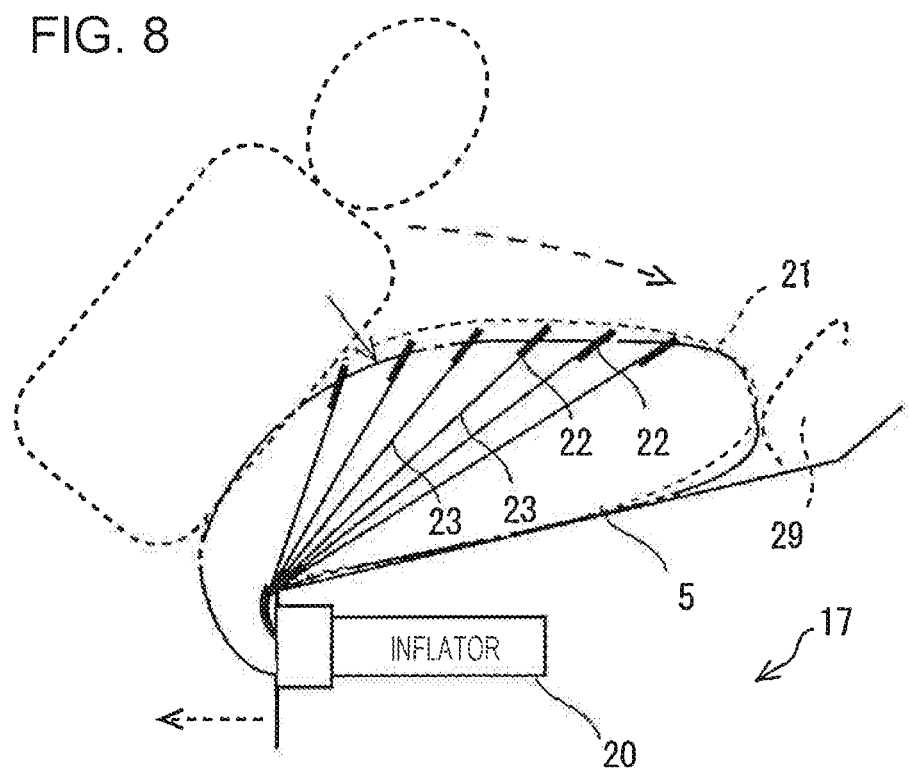
FIG. 8 is an illustration of an expanded state of a bag body according to a modification of the first embodiment.

FIG. 8 is an illustration of an expanded state of the bag body 21 according to a modification of the first embodiment.

FIG. 8 illustrates a maximum expanded state of the bag body 21 indicated by a dotted line and a state in which the load of an outside person acts on the bag body 21 indicated by a one-dot chain line. The tension of the tethers 23 acts on the irregularity formation members 22 in response to the load of the outside person acting on the bag body 21 that has slightly shrunk after expanded to the maximum extent. Even in such a case, irregularities are formed at the surface of the expanded bag body 21 by a plurality of the irregularity formation members 22 in a state of extending in the direction intersecting the surface of the bag body 21. When to be moved rearward, the body of the outside person placed on the bag body 21 that has slightly shrunk receives an action with which the body of the outside person is caught by the bag body 21. The body of the outside person is thus suppressed from easily dropping down from on the expanded bag body 21.

Figure 9:
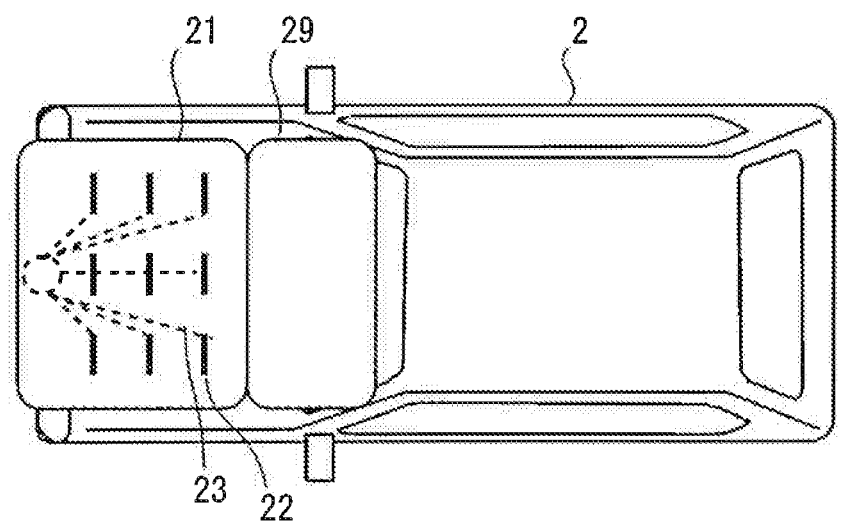
FIG. 9 is an illustration of an irregularity formation member according to a modification of the first embodiment.

FIG. 9 is an illustration of the irregularity formation members 22 according to a modification of the first embodiment.

In contrast to that the irregularity formation members 22 of the above-described embodiment each have the substantially rod-like shape, the irregularity formation members 22 in FIG. 9 each have a substantially plate-like shape. As illustrated in FIG. 6, the substantially plate-like shaped irregularity formation members 22 pass through the bag body 21 and are mounted at the inner surface of the bag body 21 such that the distal ends thereof project from the bag body 21. A plurality of such substantially plate-like shaped irregularity formation members 22 are disposed at the upper surface of the bag body 21. The substantially plate-like shaped irregularity formation members 22 extend in the direction intersecting the surface of the bag body 21 in response to the tension of the tethers 23 acting on the bag body 21 that has been expanded or that is before or after the expansion. The body of the outside person placed on the bag body 21 receives an action with which the body of the outside person is caught by the bag body 21 when to be moved rearward. The body of the outside person is thus suppressed from being easily dropping down from on the expanded bag body 21.

Figure 10:
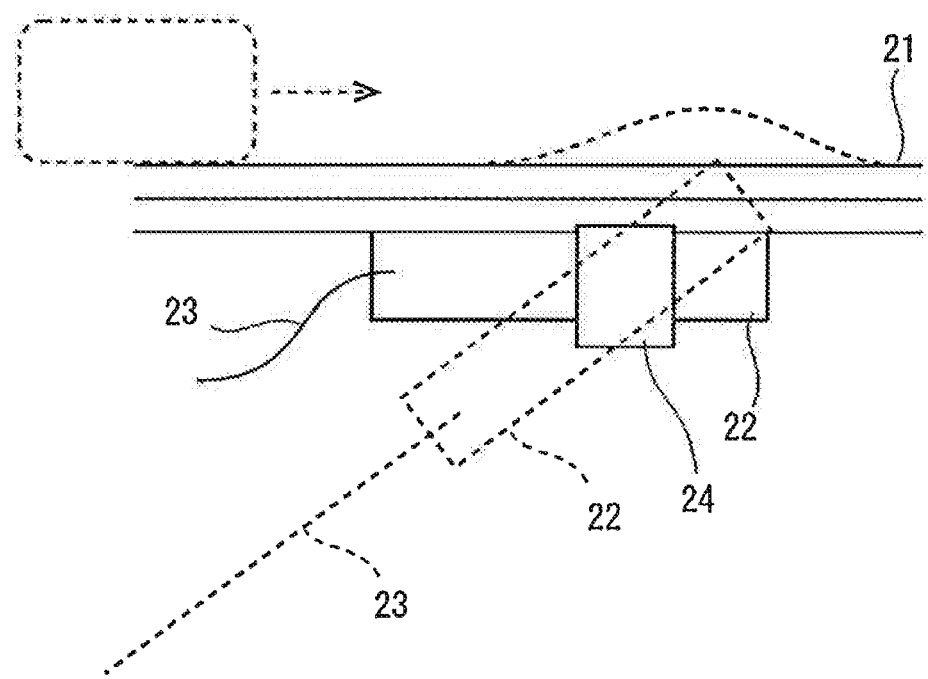
FIG. 10 is an illustration of a mounted state of the irregularity formation member according to a modification of the first embodiment with respect to the bag body.

FIG. 10 is an illustration of a mounted state of each irregularity formation member 22 according to a modification of the first embodiment with respect to the bag body 21.

In FIG. 10, a band 24 is stuck to the inner surface of the bag body 21. A center portion of the irregularity formation member 22 is held by the band 24 and thereby mounted at the inner surface of the bag body 21. Both end portions of the irregularity formation member 22 project from the band 24 in the front-rear direction of the automobile 1. The tether 23 is coupled to one of the projecting portions. In FIG. 10, the tether 23 is coupled to, of the irregularity formation member 22, the portion projecting toward the front of the automobile 1 from the band 24.

Even when the irregularity formation member 22 is thus mounted at the inner surface of the bag body 21, the irregularity formation member 22 extends in the direction intersecting the surface of the bag body 21 in response to the tension of the tether 23 acting. The projecting portion of the irregularity formation member 22 at the other end opposite to the projecting portion to which the tether 23 is coupled pushes the bag body 21 upward. Consequently, the surface of the expanded bag body 21 becomes irregular.

Receiving an action with which the body of the outside person is caught by the bag body 21 when to be moved rearward, the body of the outside person that has fallen down onto the bag body 21 is suppressed from easily dropping down from on the expanded bag body 21.

In FIG. 10, the irregularity formation member 22 is held between the band 24 and the inner surface of the bag body 21. The irregularity formation members 22, however, may be mounted at the inner surface of the bag body 21 by an adhesive and the like.

Second Embodiment

Next, the outside protection apparatus 10 of the automobile 1 according to a second embodiment of the disclosure will be described. In the present embodiment, illustration and description of components similar to those in the above-described embodiment are omitted by using identical signs. In the following description, differences from the above-described embodiment will be mainly described.

Figure 11A:
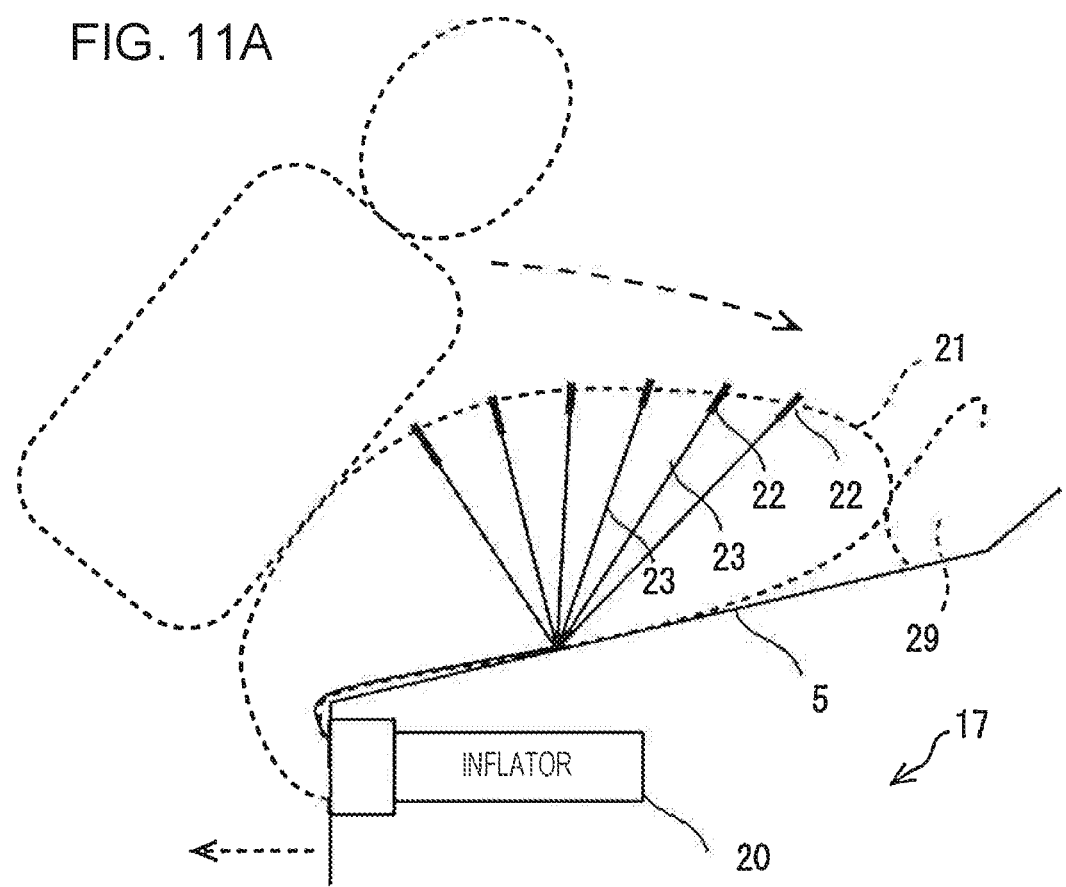
FIG. 11A and FIG. 11B are illustrations of an outside airbag device according to a second embodiment.
Figure 11B:
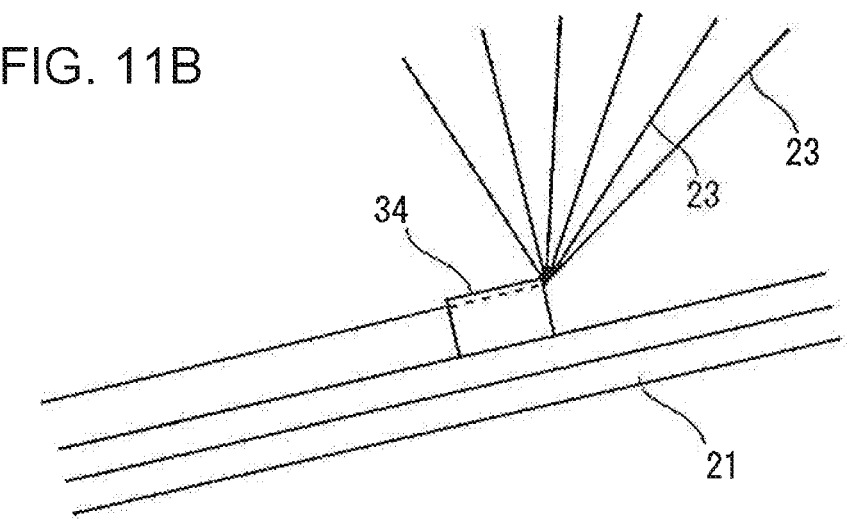

FIG. 11A and FIG. 11B are illustrations of the outside airbag device 17 according to the second embodiment.

FIG. 11A illustrates the outside airbag device 17 according to the present embodiment and an outside person.

As illustrated in the enlarged view in FIG. 11B, a band 34 is disposed at the inner surface of the bag body 21 of the outside airbag device 17. The band 34 is disposed at the lower surface of the bag body 21 in a state in which the bag body 21 is expanded on the bonnet hood 5. A plurality of the tethers 23 coupled at respective one ends to a plurality of the irregularity formation members 22 are fixed at respective other ends to the body 2 through the band 34. The band 34 may be a band that is stuck to the lower surface of the bag body 21 or may be formed by, for example, cutting the lower surface itself of the bag body 21.

Thus, in the present embodiment, the tethers 23 are inserted into the band 34 disposed at the lower surface of the bag body 21. Consequently, the plurality of irregularity formation members 22 form a large angle with respect to a face of the bag body 21 compared with the above-described embodiment in the state in which the bag body 21 is expanded.

When the angle of the plurality of irregularity formation members 22 with respect to the face of the bag body 21 is large, the body of the outside person that has fallen down onto the bag body 21 is easily caught by the distal ends of the plurality of irregularity formation members 22 projecting at the surface of the bag body 21. The body of the outside person that has fallen down onto the bag body 21 is further suppressed from easily moving on the bag body 21 and more easily remains on the bonnet hood 5.

Third Embodiment

Next, the outside protection apparatus 10 of the automobile 1 according to a third embodiment of the disclosure will be described. In the present embodiment, illustration and description of components similar to those in the above-described embodiments are omitted by using identical signs. In the following description, differences from the above-described embodiments will be mainly described.

Figure 12:
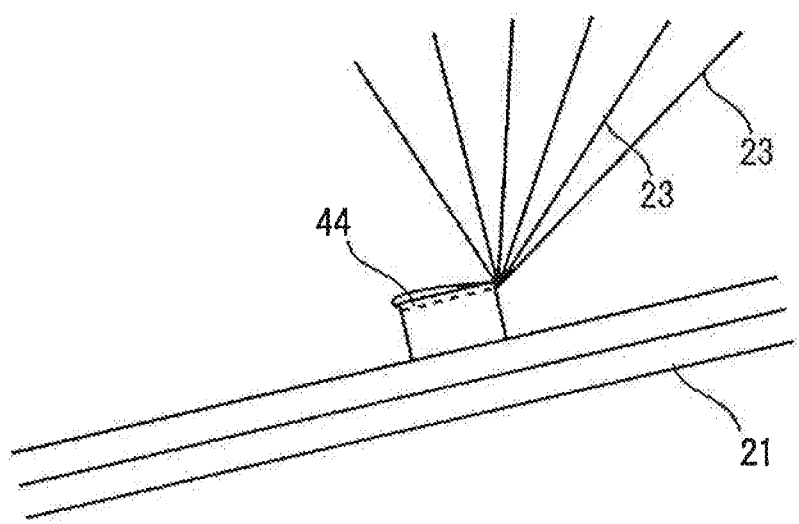
FIG. 12 is an illustration of an outside airbag device according to a third embodiment.

FIG. 12 is an enlarged illustration of the bag body 21 of the outside airbag device 17 according to the third embodiment.

A band 44 is disposed at the lower surface of the bag body 21 of the outside airbag device 17. The band 44 is disposed at the inner surface of the bag body 21 in a location spaced apart from the irregularity formation members 22. The band 44 may be a band similar to those in the above-described embodiments. The plurality of tethers 23 coupled at respective one ends to the plurality of irregularity formation members 22 are fixed at respective other ends to the band 44 disposed at the inner surface of the bag body 21.

Thus, in the present embodiment, the tethers 23 coupled at the respective one ends to the irregularity formation members 22 are fixed at the respective other ends to the band 44 disposed at the lower surface of the bag body 21. Consequently, the plurality of irregularity formation members 22 form a large angle with respect to a face of the bag body 21, as with the above-described second embodiment, in the state in which the bag body 21 is expanded.

When the angle of the plurality of irregularity formation members 22 with respect to the face of the bag body 21 is large, the body of the outside person that has fallen down onto the bag body 21 is easily caught by the distal ends of the plurality of irregularity formation members 22 projecting at the surface of the bag body 21. The body of the outside person that has fallen down onto the bag body 21 is further suppressed from easily moving on the bag body 21 and more easily remains on the bonnet hood 5.

In the present embodiment, the plurality of tethers 23 are fixed to the single band 44 disposed at the lower surface of the bag body 21. Alternatively, for example, the plurality of tethers 23 may be fixed separately to a plurality of bands 44 disposed at the lower surface of the bag body 21.

Fourth Embodiment

Next the outside protection apparatus 10 of the automobile 1 according to a fourth embodiment of the disclosure will be described. In the present embodiment, illustration and description of components similar to those in the above-described embodiments are omitted by using identical signs. In the following description, differences from the above-described embodiments will be mainly described.

Figure 13A:
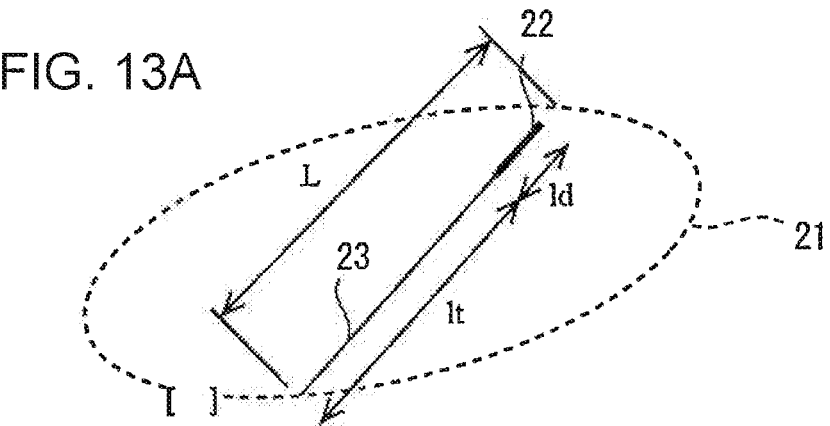
FIG. 13A, FIG. 13B, and FIG. 13C are illustrations of an outside airbag device according to a fourth embodiment.
Figure 13B:
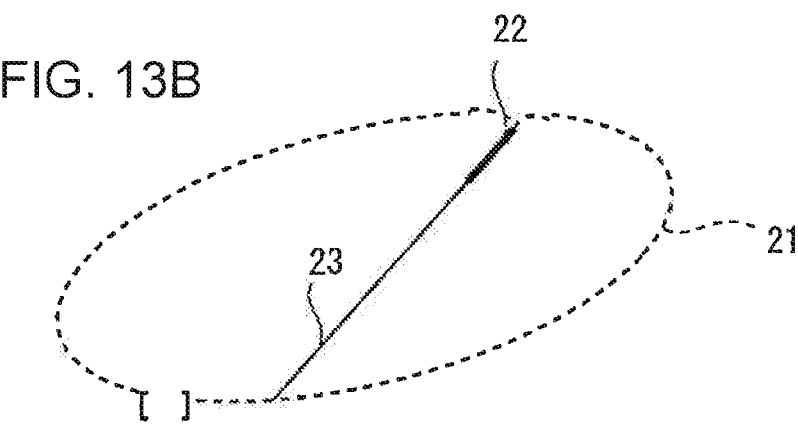
Figure 13C:
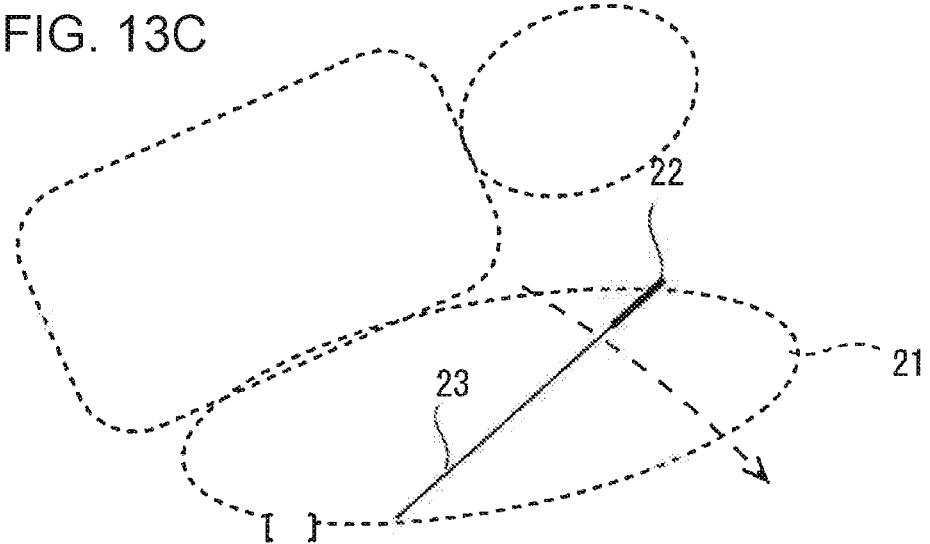

FIG. 13A, FIG. 13B, and FIG. 13C are schematic illustrations of an expanded state of the outside airbag device 17 according to the fourth embodiment. In FIG. 13A, the bag body 21 of the outside airbag device 17 is expanded to the maximum extent.

In the outside airbag device 17, the bag body 21 has a shape expandable rearward from the front surface of the body 2. The bag body 21 that has been expanded rearward from the front surface of the body 2 is expanded on the bonnet hood 5.

The outside airbag device 17 includes a plurality of irregularity formation members 22 and a plurality of tethers 23 in the inner portion of the bag body 21. In FIG. 5B, a pair of the irregularity formation member 22 and the tether 23 is representatively illustrated.

The plurality of irregularity formation members 22 are discretely disposed at the upper surface of the bag body 21 that is in a state of being expanded on the bonnet hood 5. The upper surface of the bag body 21 in the state of being expanded on the bonnet hood 5 is a face with which the other moving objects, such as a pedestrian and the like, come into contact.

The irregularity formation members 22 each have a substantially rod-like shape. The irregularity formation members 22 are mounted at the inner surface of the bag body 21. The distal ends of the substantially rod-like shaped irregularity formation members 22 may pass through the bag body 21 and project to the outside of the bag body 21.

Each tether 23 is coupled at one end to, of the irregularity formation member 22 corresponding thereto, an inner portion that projects in the inner side of the bag body 21. The tether 23 is fixed at the other end to the body 2. Here, the tether 23 is fixed to the lower surface of the bag body 21 at a location on the bonnet hood 5.

As illustrated in the schematic expanded state in 13A, the distance L from the location where the tether 23 is fixed in the state in which the bag body 21 is expanded to the maximum extent to the location where the irregularity formation member 22 is mounted with respect to the bag body 21 is longer than a sum of the length ld of the irregularity formation member 22 and the length lt from one end to the other end of the tether 23.

In the state in which the bag body 21 is expanded, the tethers 23 are bridged between the body 2 and the irregularity formation members 22 in the inner portion of the bag body 21.

In this case, differently from the first embodiment illustrated in FIG. 5A and FIG. 5B, the tethers 23 apply tension to the irregularity formation members 22 before the bag body 21 is completely expanded to the maximum extent.

Then, when the bag body 21 is expanded to the maximum extent, the distal ends of the irregularity formation members 22 are in a state of being embedded in the inner side from the outer surface of the bag body 21 as illustrated in FIG. 13B.

In response to an outside person falling down onto the bag body 21 expanded to the maximum extent and squeezing the bag body 21, the distal ends of the irregularity formation members 22 project, as illustrated in FIG. 13C, at the surface of the bag body 21 with the tension of the tethers 23 acting.

The body of the outside person that has fallen down onto the bag body 21 is easily caught, when being moved on the bag body 21, by the distal ends of the plurality of irregularity formation members 22 that project at the surface of the bag body 21. The body of the outside person that has fallen down onto the bag body 21 is further suppressed from easily moving on the bag body 21 and more easily remains on the bonnet hood 5.

The above embodiments are examples of embodiments of the disclosure. The disclosure is, however, not limited thereto. In the disclosure, various deformations or changes are possible within a range not deviating from the gist of the disclosure.

For example, in the above-described embodiments, the plurality of irregularity formation members 22 are coupled to respective tethers 23. Alternatively, for example, the plurality of irregularity formation members 22 may be coupled to the tethers 23 each shared by at least two irregularity formation members 22. For example, the plurality of tethers 23 coupled to the plurality of irregularity formation members 22 may be twisted into one tether, or the plurality of tethers 23 coupled to the plurality of irregularity formation members 22 may be coupled to another single tether 23.

In the first embodiment or the second embodiment described above, the plurality of tethers 23 are mounted at the body 2 and fixed. In the third embodiment, the plurality of tethers 23 are mounted at the inner surface of the bag body 21 and fixed. Alternatively, for example, some of the plurality of tethers 23 may be mounted at the body 2 and fixed, and the remains may be mounted at the inner surface of the bag body 21 and fixed. Some tethers 23 may be coupled at respective other ends to the other irregularity formation members 22.

In any cases, it is sufficient that the plurality of irregularity formation members 22 and the tethers 23 are coupled such that the plurality of irregularity formation members 22 disposed at the upper surface of the bag body 21 can extend, while the bag body 21 is expanded, in the direction intersecting the surface of the bag body 21 in response to the tension of the plurality of tethers 23.

The invention claimed is:

1. An outside protection apparatus for a vehicle, the apparatus comprising:
    an outside airbag device comprising a bag body expandable to be overlaid on an outer surface of a body of the vehicle, and an inflator configured to expand the bag body,
    wherein the bag body comprises
        an irregularity formation member at an inner surface of the bag body, and
        a tether coupled to the irregularity formation member to be bridged in an inner portion of the bag body in a state in which the bag body is expanded, and
    wherein the irregularity formation member forms a projection at a surface of the bag body in response to tension acting on the tether in the state in which the bag body is expanded.

2. The outside protection apparatus for a vehicle according to claim 1,
    wherein the irregularity formation member passes through the bag body and comprises an inner portion projecting in an inner side of the bag body, and
    wherein the tether is coupled at a first end to the inner portion.

3. The outside protection apparatus for a vehicle according to claim 2,
    wherein the irregularity formation member comprises a center portion mounted at the inner surface of the bag body and a projecting portion projecting from the center portion toward a front of the vehicle, and
    wherein the tether is coupled at the first end to the projecting portion.

4. The outside protection apparatus for a vehicle according to claim 2,
    wherein the tether coupled at the first end to the irregularity formation member is fixed at a second end to the body of the vehicle or the bag body, and
    wherein a distance from a location where the tether is fixed in a state in which the bag body is expanded to a maximum extent to a location where the irregularity formation member is mounted with respect to the bag body is shorter than a sum of a length of the irregularity formation member and a length from the first end to the second end of the tether.

5. The outside protection apparatus for a vehicle according to claim 2,
    wherein the tether coupled at the first end to the irregularity formation member is fixed at a second end, and
    wherein a distance from a location where the tether is fixed in a state in which the bag body is expanded to a maximum extent to a location where the irregularity formation member is mounted with respect to the bag body is longer than a sum of a length of the irregularity formation member and a length from the first end to the second end of the tether.

6. The outside protection apparatus for a vehicle according to claim 2,
    wherein the tether coupled at the first end to the irregularity formation member is fixed at a second end to the body of the vehicle.

7. The outside protection apparatus for a vehicle according to claim 2,
    wherein the tether coupled at the first end to the irregularity formation member is fixed at a second end to the inner surface of the bag body in a location spaced apart from the irregularity formation member.

8. The outside protection apparatus for a vehicle according to claim 2,
    wherein a band into which the tether is to be inserted is disposed at the bag body, and
    wherein the tether is coupled at the first end to the irregularity formation member through the band and fixed at a second end.

9. The outside protection apparatus for a vehicle according to claim 2,
    wherein the bag body comprises nylon or other resin fiber.

10. The outside protection apparatus for a vehicle according to claim 1,
    wherein the irregularity formation member comprises a center portion mounted at the inner surface of the bag body and a projecting portion projecting from the center portion toward a front of the vehicle, and wherein the tether is coupled at a first end to the projecting portion.

11. The outside protection apparatus for a vehicle according to claim 1, wherein the tether coupled at a first end to the irregularity formation member is fixed at a second end to the body of the vehicle or the bag body, and wherein a distance from a location where the tether is fixed in a state in which the bag body is expanded to a maximum extent to a location where the irregularity formation member is mounted with respect to the bag body is shorter than a sum of a length of the irregularity formation member and a length from the first end to the second end of the tether.

12. The outside protection apparatus for a vehicle according to claim 1, wherein the tether coupled at a first end to the irregularity formation member is fixed at a second end, and wherein a distance from a location where the tether is fixed in a state in which the bag body is expanded to a maximum extent to a location where the irregularity formation member is mounted with respect to the bag body is longer than a sum of a length of the irregularity formation member and a length from the first end to the second end of the tether.

13. The outside protection apparatus for a vehicle according to claim 1, wherein the tether coupled at a first end to the irregularity formation member is fixed at a second end to the body of the vehicle.

14. The outside protection apparatus for a vehicle according to claim 1, wherein the tether coupled at a first end to the irregularity formation member is fixed at a second end to the inner surface of the bag body in a location spaced apart from the irregularity formation member.

15. The outside protection apparatus for a vehicle according to claim 1, wherein a band into which the tether is to be inserted is disposed at the bag body, and wherein the tether is coupled at a first end to the irregularity formation member through the band and fixed at a second end.

16. The outside protection apparatus for a vehicle according to claim 1, wherein the bag body comprises nylon or other resin fiber.

* * * * *